United States Patent
Aschoff et al.

(10) Patent No.: US 8,631,105 B2
(45) Date of Patent: Jan. 14, 2014

(54) APPARATUS AND METHOD TO OPTIMIZE REVENUE REALIZED UNDER MULTIPLE SERVICE LEVEL AGREEMENTS

(75) Inventors: John G. Aschoff, Watsonville, CA (US); David D. Chambliss, Morgan Hill, CA (US); Bruce McNutt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2375 days.

(21) Appl. No.: 10/929,081

(22) Filed: Aug. 27, 2004

(65) Prior Publication Data

US 2006/0047542 A1 Mar. 2, 2006

(51) Int. Cl.
*G06F 15/173* (2006.01)

(52) U.S. Cl.
USPC .......................................................... 709/223

(58) Field of Classification Search
USPC ..................................... 709/225, 232; 707/10
See application file for complete search history.

(56) References Cited

U.S. PATENT DOCUMENTS

| | | | |
|---|---|---|---|
| 5,951,634 A | 9/1999 | Sitbon et al. | |
| 6,147,975 A | 11/2000 | Bowman-Amuah | |
| 6,272,110 B1 | 8/2001 | Tunnicliffe et al. | |
| 6,453,255 B1 | 9/2002 | Smorodinsky et al. | |
| 6,556,659 B1 | 4/2003 | Bowman-Amuah | |
| 6,557,035 B1 | 4/2003 | McKnight | |
| 6,571,283 B1 | 5/2003 | Smorodinsky | |
| 6,615,261 B1 | 9/2003 | Smorgrav | |
| 6,625,650 B2 | 9/2003 | Stelliga | |
| 7,359,378 B2 | 4/2008 | Berthaud et al. | |
| 2002/0049608 A1 | 4/2002 | Hartsell et al. | |
| 2002/0049841 A1 | 4/2002 | Johnson et al. | |
| 2002/0103895 A1* | 8/2002 | Chiang | 709/224 |
| 2002/0129143 A1* | 9/2002 | McKinnon et al. | 709/225 |
| 2002/0198995 A1 | 12/2002 | Liu et al. | |
| 2004/0003087 A1 | 1/2004 | Chambliss et al. | |
| 2004/0064557 A1* | 4/2004 | Karnik et al. | 709/225 |

* cited by examiner

*Primary Examiner* — Ryan Jakovac
(74) *Attorney, Agent, or Firm* — Dale F. Regelman; Quarles & Brady LLP (57) ABSTRACT

A method to optimize revenue realized under multiple service level agreements with multiple data storage clients is disclosed. The method provides an information storage and retrieval system. The method includes entering into (N) service level agreements to provide data storage services for (N) applications using the information storage and retrieval system, where each of the (N) service level agreements specifies an average maximum response time $RT_{SLA}$. The method calculates for each value of (j), the value per unit throughput $v_j$ for the (j)th application, and then determines for each value of (j) the optimum data flow rate $x_{(j)OPT}$. The method estimates, for each value of (j), a maximum data flow rate $X_{(j)MAX}$ that the (j)th application can utilize, and determines, for each value of (j), if $x_{(j)OPT}$ equals $X_{(j)MAX}$. For each value of (j) where $x_{(j)OPT}$ does not equal $X_{(j)MAX}$, the method delays execution of I/O requests from the (j)th application, such that the average response time for the (j)th application equals $RT_{(j)SLA}$.

29 Claims, 4 Drawing Sheets

APPARATUS AND METHOD TO OPTIMIZE REVENUE REALIZED UNDER MULTIPLE SERVICE LEVEL AGREEMENTS

FIELD OF THE INVENTION

This invention relates to an apparatus and method to optimize revenue realized under multiple service level agreements.

BACKGROUND OF THE INVENTION

A person offering a data storage service, such as a Storage Service Provider ("SSP") or an information services department within a company, needs to ensure that performance requirements are met for accessing the stored data. It is common in computer systems for a single data storage system to be used to hold data for multiple storage clients, which may be different computers, different applications, or different users. When the data storage system is owned by a Storage Service Provider, different clients using the same system may be separate customers, with separate contractual arrangements with the SSP.

A storage system has many components that participate in the servicing of requests from clients. These include but are not limited to: arm actuators, data channels, disk controllers, memory buses, and protocol chips on the disk drives themselves; processors, memory controllers, buses, and protocol chips on storage system controllers; and SCSI buses, network links, loops, fabric switches, and other components for the client-to-controller and controller-to-disk interconnect. A request generally requires several of these components to participate at particular steps in its processing. Many components can generally be used concurrently, so that steps in the servicing of many requests are being performed simultaneously.

To facilitate the concurrent utilization of resources, the system is built with an ability to enqueue requests and the subtasks involved in servicing them. There is a tradeoff between throughput (the total number of requests or number of bytes processed) and response time (the elapsed time from when the request is received by the system and when its completion is reported to the client). To achieve maximum throughput, a client usually submits a large number of requests for data. The large request load enables efficient workload scheduling in the system, but the response time in this case may be many times greater than that for a lightly loaded system because the requests spend a long time in the queue before being serviced.

Typically, the storage system contains one or more storage devices such as disk drives for storing data in a persistent way. It also contains one or more processors that handle requests for access, generally calling upon the storage devices to do so. Associated with these storage devices and processors are memory devices and data transfer channels, such as data buses, that are all needed for processing the requests. The system further includes some form of interconnect facility through which the clients submit data requests to the processors. This may be a network capable of supporting general purpose communications among clients, processors and other devices, or it may consist of more specialized interconnect facilities such as direct connections. Within one system, there may be many instances of each kind of device and facility. These are all resources of the system; however, they need not all be owned exclusively by the storage system. For example, the processors and memory buses might be involved in other computational tasks that are not part of handling storage requests from the clients.

One request from a client to the system generally does not require exclusive use of all resources. The system is designed therefore to handle many requests from many clients concurrently by scheduling stages in the processing of requests concurrently, such as disk arm motion and data transfer. One of the system's functions for achieving concurrency is queuing, by which the stages of processing for one request can be delayed when other requests are occupying required resources.

Storage service providers often enter into Service Level Agreements ("SLAs") with data owners, whereby each SLA typically specifies a maximum average response time, i.e. an $RT_{SLA}$, for requests made by the data owner to write and/or read data to and/or from the SSPs storage facility. When servicing requests from (N) multiple data owners under (N) SLAs, the SSP must allocate system resources such that $RT_{(j)SLA}$, for each value of (j), is satisfied, where (j) is greater than or equal to 1 and less than or equal to (N).

Although the data objects used by different clients will generally be separate, the storage system resources involved in accessing those data objects will often overlap. These resources may include any of the components described above, such as storage devices, processors, memory, buses, and interconnect. One client's access to data can suffer performance degradation when another client consumes too much of one or more resources. If this competition for resources is not controlled, may be difficult to meet the response times specified in the (N) SLAs. Even if each $RT_{(j)SLA}$ is satisfied, permitting each of the (N) applications to consume arbitrary levels of system resources will not likely generate the maximum revenue for the storage system provider.

Various mechanisms are known in the art to allocate system resources amongst multiple storage system clients. What is needed, however, is an apparatus and method to both satisfy the contractual obligations of the storage system provider, and provide system resources in a way that maximizes the revenue to the storage system provider.

SUMMARY OF THE INVENTION

Applicants' invention includes an apparatus and method to optimize revenue realized under multiple service level agreements. The method provides an information storage and retrieval system, comprising one or more data storage devices. The method includes entering into (N) service level agreements to provide data storage services for (N) applications using the information storage and retrieval system, where each of the (N) service level agreements specifies an average maximum response time $RT_{SLA}$.

The method calculates for each value of (j), the value per unit throughput $v_j$ for the (j)th application, and then determines for each value of (j) the optimum data flow rate $x_{(j)OPT}$. The method estimates, for each value of (j), a maximum data flow rate $X_{(j)MAX}$ that the (j)th application can utilize, and determines, for each value of (j), if $x_{(j)OPT}$ equals $X_{(j)MAX}$. For each value of (j) where $x_{(j)OPT}$ does not equal $X_{(j)MAX}$, the method delays execution of I/O requests from the (j)th application, such that the average response time for the (j)th application equals $RT_{(j)SLA}$.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to operate a data processing system. A pending United States Patent Application having Ser. No. 10/187,227, owned by the common assignee hereof, further describes Applicants' computer storage system, and is hereby incorporated by reference herein.

Figure 2:
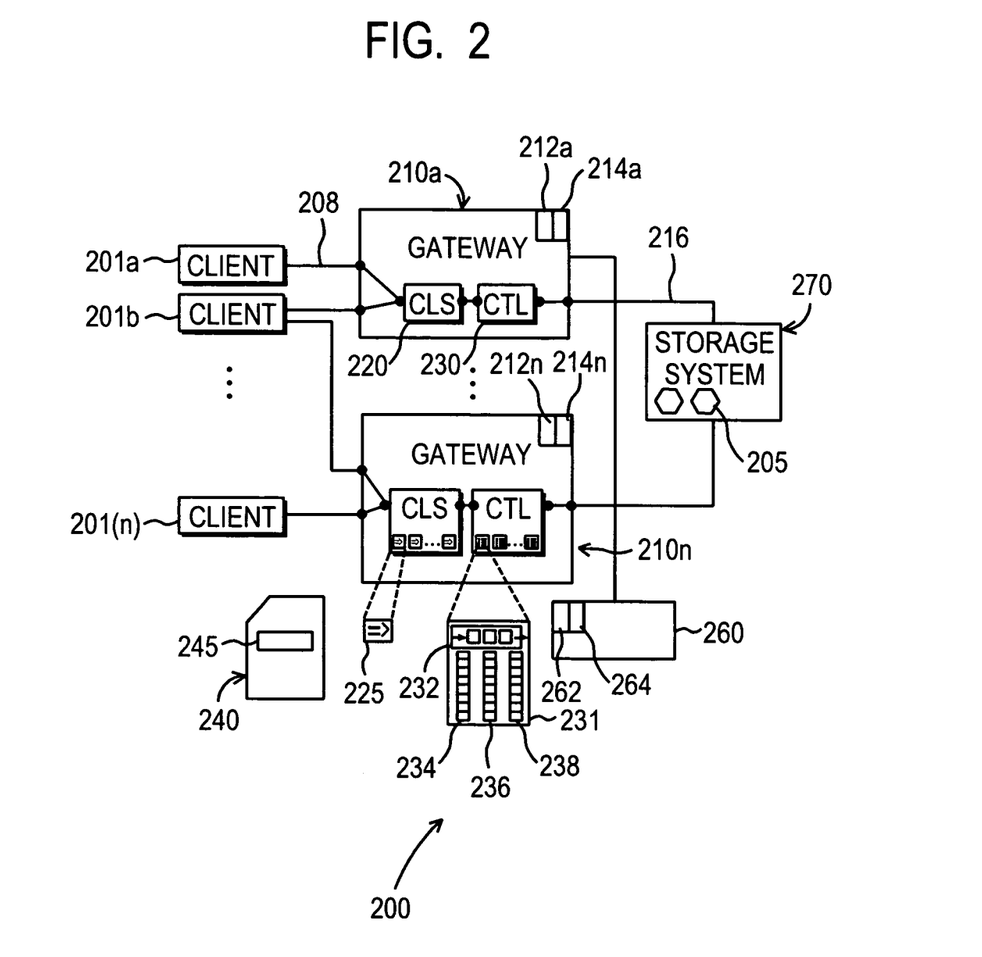
FIG. 2 is a block diagram showing one embodiment of Applicants' data processing system.

Referring now to FIG. 2, Applicants' data processing system 200 includes a number of clients 201, such as in the illustrated embodiment clients 201a, 201b, and 201n. In the illustrated embodiment of FIG. 2, Applicants' data processing system includes interconnections with 3 clients. In certain embodiments, (N) clients are capable of writing data to, and/or reading data from, Applicants' storage system, where (N) is greater than 3.

In certain embodiments, one or more of the (N) clients comprises a computer system, such as a mainframe computer, personal computer, workstation, and combinations thereof, including one or more operating systems such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) As those skilled in the art will appreciate, such interconnected computers are often referred to as host computers. In certain embodiments, one or more of the (N) clients comprises an application running on a host computer.

Each of the (N) clients is capable of generating requests 240 for the storage system 270 to store data to and retrieve data from data objects 205 associated with the storage system. The requests 240 contain attributes 245 such as whether data is stored or retrieved, the location at which the data is stored or retrieved, and the length of the request. The storage system 270 may consist of one device or multiple devices which are used by their owner to constitute a single data storage facility. Each client has at least one gateway connection 208 to a gateway 210, such as in the illustrated embodiment gateways 210a and 210n.

Each gateway includes a processor, such as processors 212a and 212n, and a memory, such as memory 214a and 214n. In certain embodiments, each gateway device further includes a request classifier 220 and a flow controller 230. A client may have connections to multiple gateways as well as multiple connections to the same gateways, and multiple clients may have connections to the same gateway.

Each gateway has at least one storage connection 216 to the storage system, i.e. system 270, by which it can transmit requests to the storage system and by which the storage system transmits the responses to these requests to the gateway. The gateways are connected to a Quality of Service ("QoS") server 260 which provides configuration and control information to the gateways and extracts and stores monitor data from the gateways. QoS Server 260 includes processor 262 and memory 264.

Within each flow controller 230 in operation are data objects each of which is referred to as a service class 231. Each service class contains a balance vector 234, a replenishment rate vector 236, and a carryover limit vector 238. Also in each service class 231 is a delay queue 232 into which requests 240 can be enqueued.

Within each classifier 220 in operation are data objects each of which is referred to as a classification rule 225. The classification rules 225 contain information by which each request 240 is associated with a service class 231.

Figure 3:
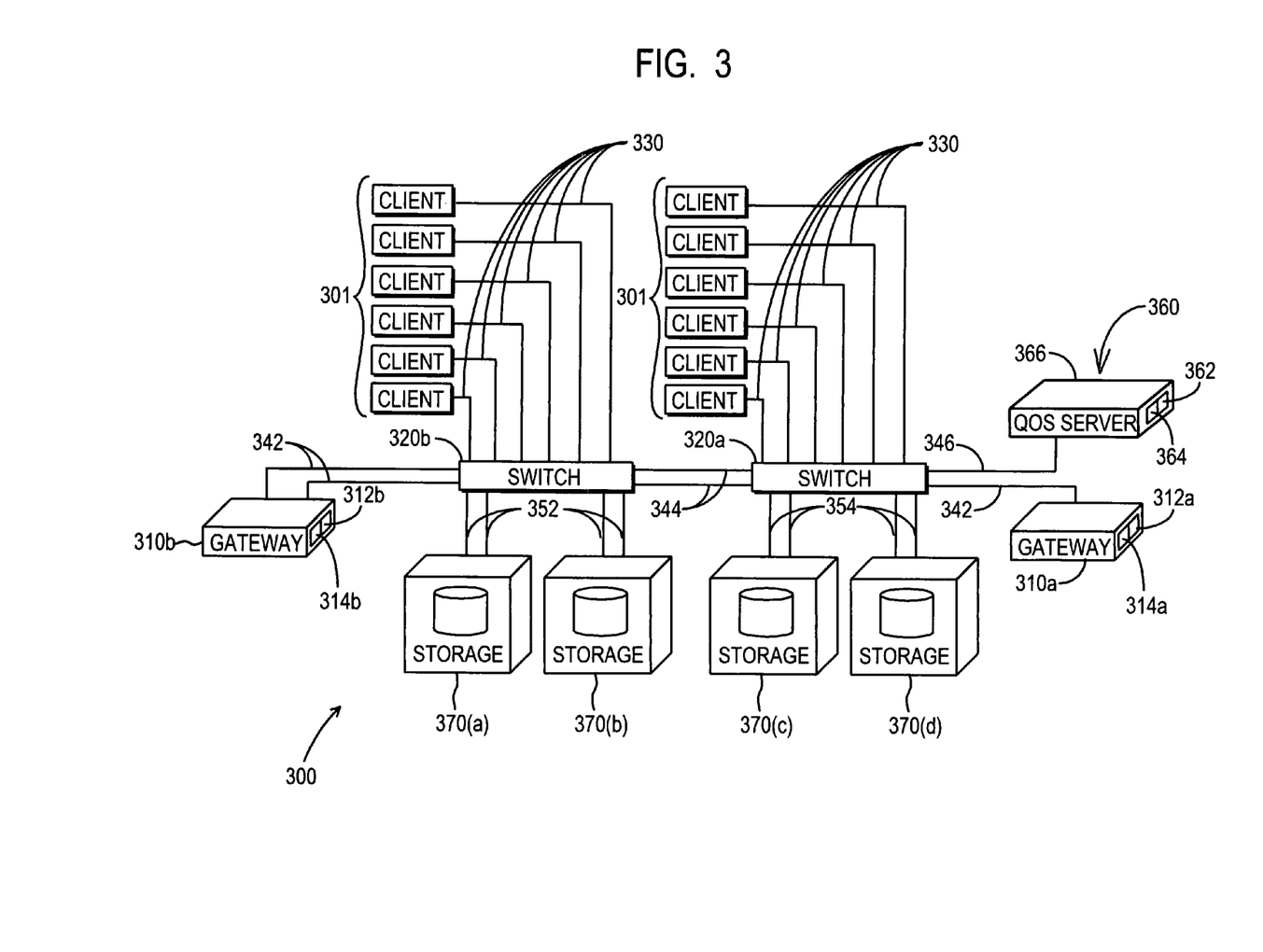
FIG. 3 is a block diagram showing a second embodiment of Applicants' data processing system.

FIG. 3 illustrates one embodiment of the logical configuration and capabilities shown in FIG. 2. The clients 301 comprise computers on which applications are generating I/O requests. Applicants' data processing system 300 includes one or more information storage and retrieval systems 370 which use data storage devices to create logical units which are made available for use by the clients.

In the illustrated embodiment of FIG. 3, the clients 301 are interconnected with either switch 320a or 320b via a plurality of communication links 330. Switches 320a and 320b are interconnected with one another via a plurality of communication links 344, and with gateways 310a and 310b via a plurality of communication links 342. Switch 320b is interconnected to storage system 370a and 370b via a plurality of communication links 352. Switch 320a is interconnected to storage systems 370c and 370d via a plurality of communication links 354.

In certain embodiments, communication links 330, 342, 344, 346, 352, and 354, are selected from a serial interconnection, such as RS-232 or RS-422, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, the clients, storage system, and gateways are attached in a network via Fibre Channel hardware, through one or more switch fabrics 320. In these Fibre Channel embodiments, gateways 320a and 320b are computing devices comprising a processor and a memory, and are attached to the Fibre Channel fabric.

In certain embodiments, a processor disposed in the gateway, such as processor 362, executes a program, such as program 368, stored in memory 364 that performs the actions of a classifier 220 and a flow controller 230. QoS Server 360 comprises a computing device 366 which includes a processor 362, a memory 364, and one or more programs 368 stored in memory 364.

Figure 1:
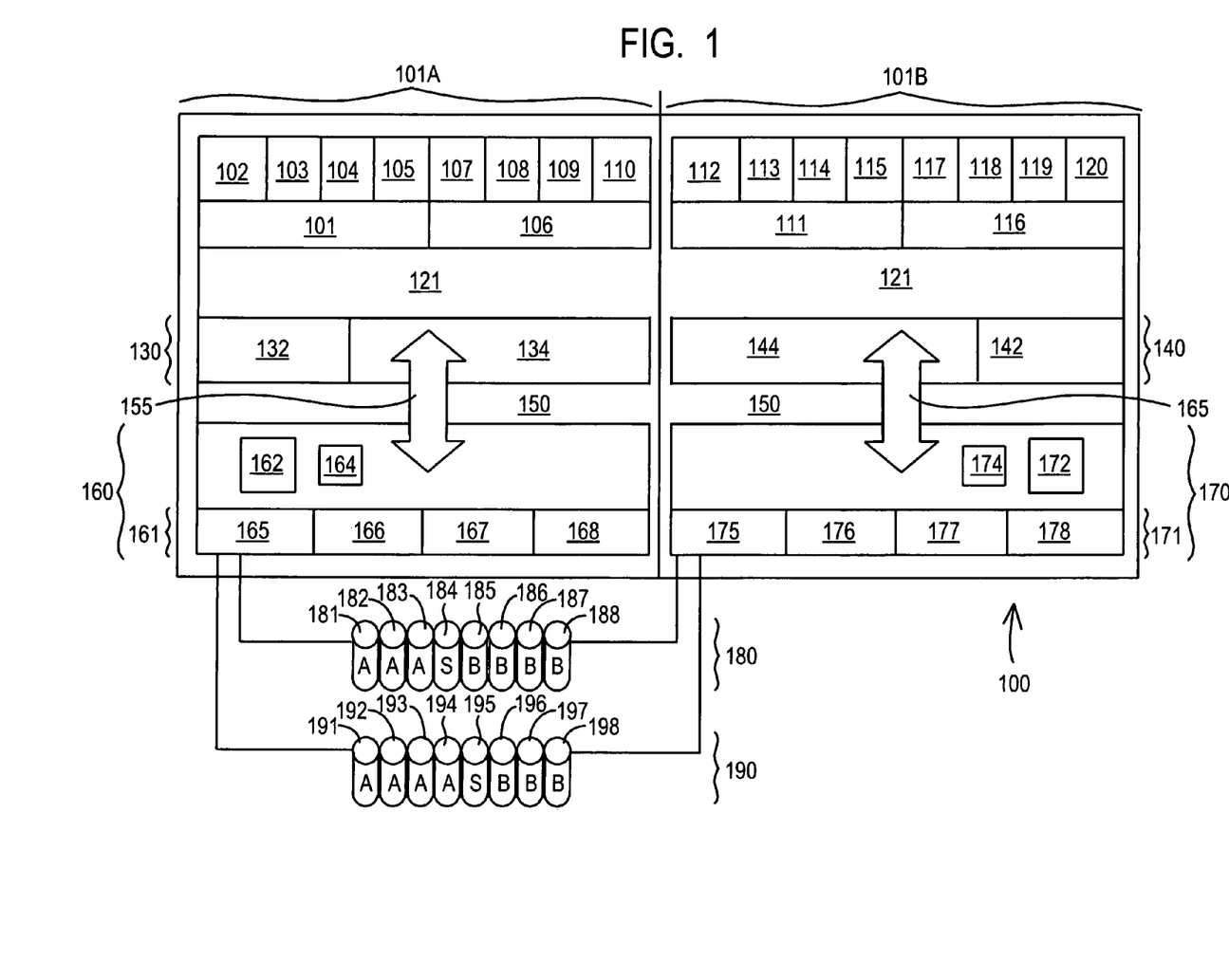
FIG. 1 is a block diagram showing one embodiment of Applicants' information storage and retrieval system.

In certain embodiments, storage system 270 (FIG. 2), and/or one or more of storage systems 370 (FIG. 3), comprise Applicants' information storage and retrieval system 100 (FIG. 1). In the illustrated embodiment of FIG. 1, Applicants' information storage and retrieval system 100 includes a first cluster 101A and a second cluster 101B. Each cluster includes a processor portion 130/140 and an input/output portion 160/170, respectively. Internal PCI buses in each cluster are connected via a Remote I/O bridge 155/165 between the processor portions 130/140 and device I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one or more Fibre Channel ports, one or more FICON ports, one or more ESCON ports, or one or more SCSI ports. Each host adapter is connected to both clusters through one or more Common Platform Interconnect bus 121 such that each cluster can handle I/O from any host adapter.

Processor portion 130 includes processor 132 and cache 134. In certain embodiments, processor portion 130 further include memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further include memory 143. In certain embodiments, memory device 143 comprises random access memory. In certain embodiments, memory device 143 comprises non-volatile memory.

I/O portion 160 includes non-volatile storage ("WS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two arrays, namely array "A" and array "B". The illustrated embodiment of FIG. 1 shows two disk arrays. In other embodiments, Applicants' information storage and retrieval system includes more than two hard disk arrays. Each array of drives appears to a host computer as one or more logical drives.

In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and reliability that exceeds that of a single large drive.

In certain embodiments, Applicants' storage system 270/370 comprises an automated media library comprising a plurality of tape cartridges, one or more robotic accessors, and one or more tape drives. U.S. Pat. No. 5,970,030, assigned to the common assignee herein, describes such an automated media library and is hereby incorporated by reference. In certain embodiments, Applicants' storage system 270/370 comprises a virtual tape system. U.S. Pat. No. 6,269,423, assigned to the common assignee herein, describes such a virtual tape system, and is hereby incorporated by reference.

Figure 4:
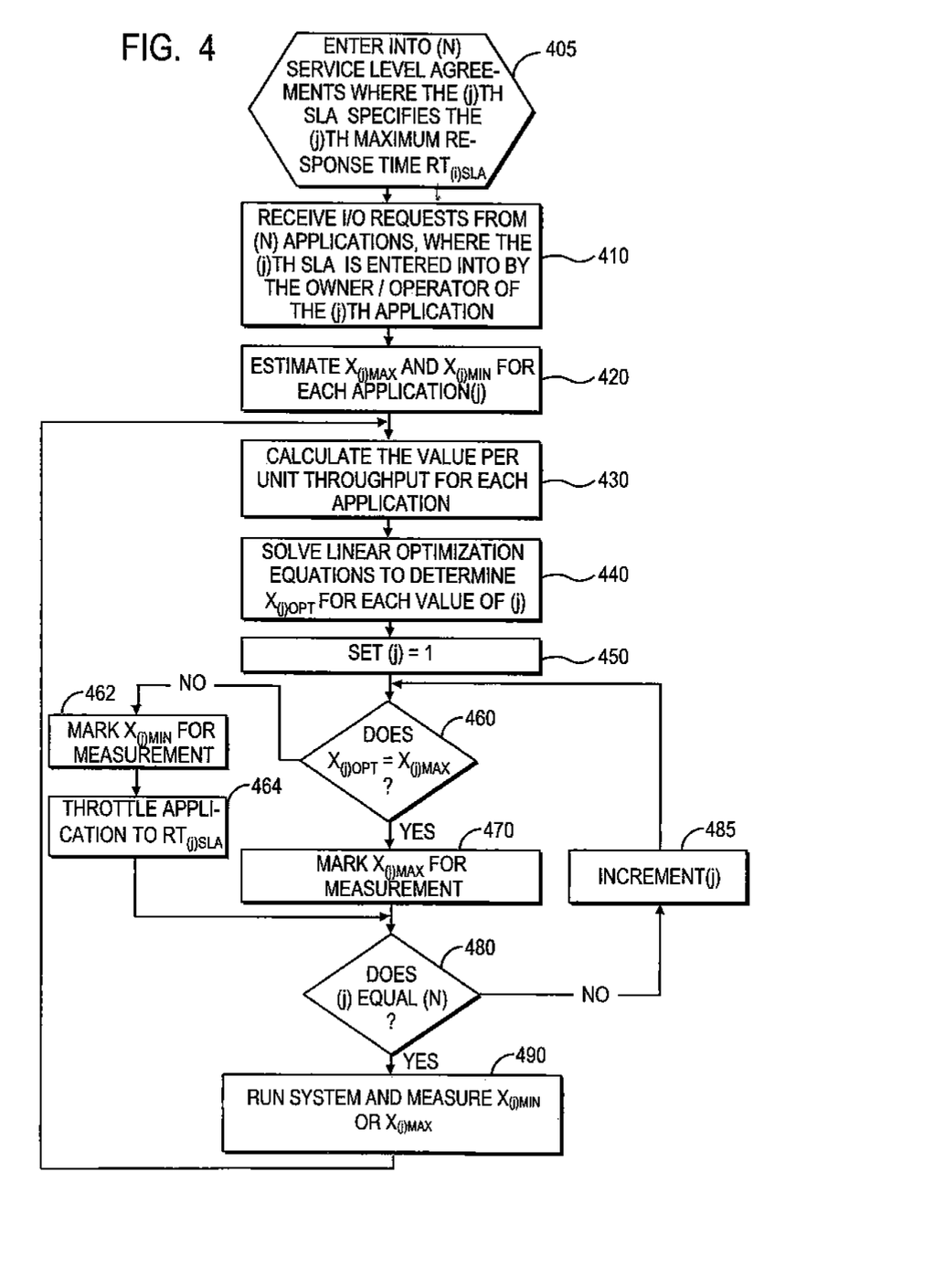
FIG. 4 is a flow chart summarizing the steps of Applicants' method.

FIG. 4 summarizes the steps of Applicants' method. In certain embodiments, Applicants' method is used to optimize revenue realized by a data storage services provider under multiple service level agreements with one or more data storage clients. In certain embodiments, Applicants' method is used to optimize the total value of a set of applications being run for one storage services customer by a data storage services provider. In certain embodiments, Applicants' method is used to optimize the total value of a set of applications being run for a plurality of storage services customers by a data storage services provider.

In step 405, the Storage System Provider ("SSP") enters into (N) Service Level Agreements ("SLAs") for (N) applications, where the (j)th SLA specifies a maximum average response time $RT_{(j)SLA}$. In entering into the SLA, the SSP agrees that the (j)th application will receive I/O services, such that the average I/O request from the (j)th application is serviced within the specified $RT_{(j)SLA}$.

In step 410, the SSP operates the storage system, such as for example system 200 or system 300, where the system receives I/O requests from the N) applications. In step 420, Applicants' method measures and saves the maximum data flow rate for each of the (N) applications. These values are used to initialize the quantities $X_{(j)MAX}$, which in the subsequent operation of the algorithm, represent estimates of the maximum data flow rate that the (j)th application can utilize. That is, providing system resources in excess of those needed to reach $X_{(j)MAX}$ will be estimated not to result in an higher throughput for the (j)th application. The quantities $X_{(j)(MIN)}$ are also set to initial values in step 420. In subsequent operation of the algorithm, the values $X_{(j)(MIN)}$ represent estimates of the data flow rate that the (j)th application will utilize when its average I/O response time is equal to the specified $RT_{(j)SLA}$. In certain embodiments, the initial value of $X_{(j)(MIN)}$ is set to $0.5*X_{(j)MAX}$. Step 420 can be performed any time after step 410 and prior to performing step 460.

In certain embodiments, step 420 is performed by the SSP. In certain embodiments, step 420 is performed by a gateway device, such as gateway device 210 (FIG. 2)/310 (FIG. 3), interconnecting the client comprising the (j)th application and Applicants' information storage and retrieval system 270 (FIG. 2). In certain embodiments, step 420 is performed by Quality Of Service server 260 (FIG. 2). In certain embodiments, the values for $X_{(j)MAX}$ are saved in memory 214 (FIG. 2)/314 (FIG. 3). In certain embodiments, the values for $X_{(j)MAX}$ are saved in memory 264 (FIG. 2)/364 (FIG. 3).

In step 430, Applicants' method calculates and saves the value per unit throughput $v_j$ for the (j)th application. As those skilled in the art will appreciate, $v_j$ can be expressed in any units of currency, i.e. U.S. Dollars, Euros, and the like. Step 420 may be performed any time after performing step 405 and prior to performing step 440.

In certain embodiments, step 430 is performed by the SSP. In certain embodiments, step 430 is performed by a gateway device, such as gateway device 210 (FIG. 2)/310 (FIG. 3), interconnecting the client comprising the (j)th application and Applicants' information storage and retrieval system 270 (FIG. 2). In certain embodiments, step 430 is performed by Quality Of Service server 260 (FIG. 2). In certain embodiments, the values for $v_j$ are saved in memory 214 (FIG. 2)/314 (FIG. 3). In certain embodiments, the values for $v_j$ are saved in memory 264 (FIG. 2)/364 (FIG. 3).

In certain embodiments of Applicants' method, the quantities $v_j$ are determined solely from contractual agreements, i.e. the SLAs, in which a base payment level $P_j$ is stated in return for a corresponding base level of throughput $Y_j$, provided that the required response time objective is met. In that case, $v_j = P_j/Y_j$. In other embodiments, $v(j)$ may also reflect dynamic adjustments of the contractual agreement. For example, the service level agreement may permit the application to add incremental payments to $v_j$ as a temporary mechanism by which to influence the priority with which requests by the application are being handled. In certain of these embodiments, $$v_j = (1+F_j)*P_j/Y_j$$

where $F_j >= 0$ is an adjustment factor specified dynamically by the application.

In step 440, Applicants' method maximizes linear optimization Equation (1), $$x_1 v_1 + x_2 v_2 + \ldots + x_n v_j \qquad (1)$$

where $x_j$ represents the throughput, i.e. the data flow rate, for the (j)th application. Thus, the term $x_j v_j$ represents the monies generated by the (j)th application. Step 440 includes maximizing equation (1), subject to the constraints of Equations (2) and Equation (3):

$$c_{11}x_1 + c_{12}x_2 + \ldots + c_{1j}x_j \leq U_1$$
$$c_{21}x_1 + c_{22}x_2 + \ldots + c_{2j}x_j \leq U_2$$
$$\ldots$$
$$c_{m1}x_1 + c_{m2}x_2 + \ldots + c_{mj}x_j \leq U_m$$

Equations (2)

$$X_{(j)MIN} \leq x(j) \leq X_{(j)MAX}$$

Equation (3)

Referring now to Equations (2), the equation $c_{11}x_1 + c_{12}x_2 + \ldots + c_{1j}x_j$ comprises the aggregate usage of a first system resource by all (N) applications. System resources include, for example, device adapter bandwidth, host adapter bandwidth, disk utilization, and the like. For that first system resource, $U_1$ comprises the maximum available level of that first system resource. For the k-th system resource, $U_k$ comprises the maximum allowable utilization of that resource. This is the maximum average utilization with which it is feasible for each application that uses the resource to satisfy its response time $RT_{(j)SLA}$. Needless to say, the aggregate usage of a system resource by all (N) applications cannot exceed the maximum available level of that system resource.

In certain embodiments, the values $c_{nj}$ and $U_n$ in Equations (2) are obtained from the known characteristics of the system resources, from the distribution of the data used by the j-th application over those resources, and from the characteristics of the requests generated by the j-th application. For example, if the (n)th resource is a data channel with bandwidth capacity of 200 megabytes per second, and the (j)th application transmits 50% of its data over this channel, and if $x_j$ is measured as the number of megabytes transmitted by the (j)th application per second, then we would have $U_n = 200$ and $c_{nj} = 0.5$ (expressing 50% as a fraction). In certain embodiments, the values $c_{nj}$ and $U_n$ in Equations (2) may be changed over time either because the system determines that the characteristics of the system resources, the distribution of data over the resources, or the characteristics of requests are different from what was used to produce the prior set of values. This determination may be done, for example, by the QoS Server 260 (FIG. 2) using data obtained by the gateway device 210 (FIG. 2).

Referring now to Equation (3), the value for x(j) must fall within the range bounded by $X_{(j)MIN}$ and $X_{(j)MAX}$. $X_{(j)MIN}$ represents the minimum level of system resources that must be provided to application (j) in order for the storage system to fulfill its contractual obligations, i.e. application (j) must realize an average response time less than or equal to $RT_{(j)SLA}$. $X_{(j)MAX}$ represents the maximum level of system resources that application (j) can effectively utilize.

Methods to solve linear optimization equations, such as Equation (1) subject to Equations (2) and Equation (3), are known in the art. For example, Harvey M. Wagner, *Principles of Operations Research: With Applications to Managerial Decisions*, 2nd Edition, Prentice-Hall: Englewood Cliffs, 1975, at Section 5.10 entitled "Upper-Bounded Variables teaches a method for solving linear optimization equations, such as Equation (1) subject to Equations (2) and Equation (3), and is hereby incorporated by reference.

By maximizing Equation (1), subject to the constraints of Equations (2) and Equation (3), step 440 calculates (N) optimum data flow rates to maximize the revenues realized by the SSP, where $x_{(j)OPT}$ represents the optimum data flow rate for the (j)th application.

In step 450, Applicants' method sets (j) equal to 1. In step 460, Applicants' method determines if the optimum data throughput rate, $x_{(j)OPT}$, calculated in step 440 for the (j)th application, is equal to the measured maximum data flow rate $X_{(j)MAX}$ measured in step 420 for the (j)th application. Step 460 includes obtaining the stored values for $X_{(j)MAX}$ and $x_{(j)OPT}$ from memory, such as for example memory 214 (FIG. 2), 314 (FIG. 3), 264 (FIG. 2), and/or memory 364 (FIG. 3). In certain embodiments, step 450 is performed by a gateway, such as for example gateway 210a (FIG. 2) In certain embodiments, step 450 is performed by a Quality Of Service server, such as QOS server 260 (FIG. 2).

If Applicants' method determines in step 460 that the optimum data throughput rate $x_{(j)OPT}$ is equal to the measured maximum data flow rate $X_{(j)(MAX)}$, then the method transitions from step 460 to step 470 wherein the method sets an indicator to indicate that $X_{(j)MAX}$ is to be later measured.

In certain embodiments, Applicants' method creates and maintains a database which includes the calculated values for $x_{(j)(OPT)}$, the values for RT(j) abstracted from the relevant SLAs, and measured values for certain parameters $X_{(j)MAX}$ and $X_{(j)MIN}$, in accord with steps 462 and 470 of Applicants' method. In these embodiments, step 470 includes setting a field in the database which indicates that $X_{(j)MAX}$ is to be measured when the provision of system resources is "throttled" for certain other applications. In certain embodiments, this database is created and maintained in a Quality or Service Server, such as for example QoS Server 260 (FIG. 2). In certain embodiments, this database is created and maintained in gateway device, such as for example gateway device 210a (FIG. 2).

In other embodiments, Applicants' method includes forming a bitmap comprising (N) bits, where each of those bits can have a first value or a second value. Setting the (j)th bit to the first value indicates that the scheduling of requests from the (j)th application should not be intentionally delayed, and that the measurements of actual throughput for the (j)th application should be used to update estimates of $X_{(j)MAX}$. Setting the (j)th bit to the second value indicates that the scheduling of requests from the (j)th application should be intentionally delayed such that the response-time requirement in the SLA is just met, and that the measurements of actual throughput for the (j)th application should be used to update estimates of $X_{(j)MIN}$.

In certain embodiments, this bitmap is created and maintained in a Quality or Service Server, such as for example QoS Server 260 (FIG. 2). In certain embodiments, this bitmap is created and maintained in gateway device, such as for example gateway device 210a (FIG. 2). In these bitmap embodiments, if Applicants' method determines in step 450 that the optimum data throughput rate, $x_{(j)OPT}$, calculated in step 440 for the (j)th application, is equal to the measured maximum data flow rate $X_{(j)(MAX)}$ measured in step 440, then in step 470 the method sets the (j)th bit in the bitmap to the first value.

Alternatively, if Applicants' method determines in step 460 that the optimum data throughput rate, $x_{(j)OPT}$ is not equal to the measured maximum data flow rate $X_{(j)(MAX)}$, then the method transitions from step 460 to step 462 wherein the method indicates that $X_{(j)MIN}$ is to be measured. In certain embodiments, step 462 includes setting a field in the database described above, where that field indicates that $X_{(j)MIN}$ is to be measured for the (j)th application. In certain embodiments, step 462 includes setting the (j)th bit in the above-described bitmap of (N) bits to the second value.

Applicants' method transitions from step 462 to step 464 wherein the method throttles the (j)th application such that I/O requests serviced from the (j)th application just comply with the average response time specified in the (j)th SLA, i.e. to $RT_{(j)SLA}$. In certain embodiments, step 464 includes enqueuing I/O requests received from the (j)th application, where those I/O requests are enqueued for incrementally increasing time periods until Applicants' data processing system just reaches the contractual $RT_{(j)SLA}$.

In certain embodiments, step 464 is performed by a gateway device, such as gateway device 210 (FIG. 2)/310 (FIG. 3), interconnecting the client comprising the (j)th application and Applicants' information storage and retrieval system 270 (FIG. 2). In certain embodiments, step 464 is performed by Quality Of Service server 260 (FIG. 2). Applicants' method transitions from step 464 to step 480.

In step 480, Applicants' method determines if the calculated value for $x_{(j)OPT}$ has been compared to the measured value for $X_{(j)MAX}$ for each of the (N) applications, i.e. if (j) equals (N). In certain embodiments, step 470 is performed by a gateway device interconnecting the computer running the (j)th application and Applicants' information storage and retrieval system. In certain embodiments, step 480 is performed by a Quality Of Service server interconnected with the computer running the (j)th application and with Applicants' information storage and retrieval system.

If Applicants' method determines in step 480 that the calculated value for $x_{(j)OPT}$ has not been compared to the measured value for $X_{(j)MAX}$ for each of the (N) applications, then Applicants' method transitions from step 480 to step 485 wherein the method increments (j). Applicants' method transitions from step 485 to step 460 and continues as described above.

Alternatively, if Applicants' method determines in step 480 that the calculated value for $x_{(j)OPT}$ has been compared to the measured value for $X_{(j)MAX}$ for each of the (N) applications, then Applicants' method transitions from step 480 to step 490 wherein the method operates Applicants' data processing system, such as for example system 200/300, and for each value of (j) measures the actual throughput utilized by the (j)th application, and updates the saved value of either $X_{(j)MIN}$ or $X_{(j)MAX}$, as determined by steps 462 or 470, respectively. In some embodiments either $X_{(j)MIN}$ or $X_{(j)MAX}$ is replaced with the newly measured value. In other embodiments, the updated value is a combination of the previous value with the newly measured value. Applicants' method transitions from step 490 to step 430 and continues as described above.

In certain embodiments, individual steps recited in FIG. 4 may be combined, eliminated, or reordered. For example, one embodiment of Applicants' method includes steps 405 through 480, wherein the method ends when (j) equals (N).

In certain embodiments, Applicants' invention includes instructions residing in memory 264 (FIG. 2), where those instructions are executed by processor 262 (FIG. 2) to performs steps 410, 420, 430, 440, 450, 460, 462, 464, 470, 480, 485, and 490, recited in FIG. 4. In certain embodiments, Applicants' invention includes instructions residing in memory 214 (FIG. 2), where those instructions are executed by processor 212 (FIG. 2) to perform steps 410, 420, 430, 440, 450, 460, 462, 464, 470, 480, 485, and 490, recited in FIG. 4. In other embodiments, Applicants' invention includes instructions residing in any other computer program product, where those instructions are executed by a computer external to, or internal to, system 200/300, to perform steps 410, 420, 430, 440, 450, 460, 462, 464, 470, 480, 485, and 490, recited in FIG. 4. In any of these embodiments, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to optimize revenue realized under multiple service level agreements, comprising the steps of:
providing an information storage and retrieval system, comprising one or more data storage devices;
entering into (N) service level agreements with one storage services customer by a storage services provider to provide data storage services for (N) applications using said information storage and retrieval system, wherein each of said (N) service level agreements specifies a maximum response time $RT_{SLA}$ comprising an elapsed time from receipt by the storage services provider from a storage services customer of a request to write data to a data storage device or read data from a data storage device and completion of that request, and wherein a (j)th SLA recites a $RT_{(j)SLA}$, wherein (j) is greater than or equal to 1 and less than or equal to (N), and wherein (N) is greater than 1;
calculating for each value of (j), a monetary value per unit throughput $v_j$ for the (j) th application;
calculating (N) optimum data flow rates to maximize the revenues to the storage services provider;
determining for each value of (j) an optimum data flow rate $x_{(j)OPT}$;
initializing, for each value of (j), a maximum data flow rate $X_{(j)MAX}$ that the (j) th application can utilize;
determining, for each value of (j), if $x_{(j)OPT}$ equals $X_{(j)MAX}$;
for each value of (j) wherein $x_{(j)OPT}$ does not equal $X_{(j)MAX}$, delaying execution of I/O requests from the (j) th application, such that the average response time for the (j) th application equals $RT_{(j)SLA}$.

2. The method of claim 1, further comprising the steps of:
providing (N) indicators, wherein each of said (N) indicators can comprise a first value or a second value;
for each value of (j) wherein $x_{(j)OPT}$ equals $X_{(j)MAX}$, setting the (j) th indicator to said first value;
for each value of (j) wherein $x_{(j)OPT}$ does not equal $X_{(j)MAX}$, setting the (j) th indicator said second value;
servicing I/O requests from said (N) applications;
operative if the (j) th indicator is set to said first value, measuring $X_{(j)MAX}$;
operative if the (j) th indicator is set to said second value, measuring $X_{(j)MIN}$, wherein $X_{(j)MIN}$ comprises the minimum data flow rate for the (j) th application to achieve $RT_{(j)SLA}$;
repeating said maximizing and determining steps, and for each application (j) wherein $x_{(j)OPT}$ does not equal $X_{(j)MAX}$, repeating said delaying step.

3. The method of claim 2, wherein said providing (N) indicators step further comprises providing a bitmap comprising (N) bits.

4. The method of claim 3, further comprising the steps of:
providing a Quality of Service server capable of communicating with each of said (N) applications and with said information storage and retrieval system;
disposing said bitmap in said Quality of Service server.

5. The method of claim 3, further comprising the steps of:
providing a gateway device capable of communicating with each of said (N) applications and with said information storage and retrieval system;
disposing said bitmap in said gateway device.

6. The method of claim 2, further comprising the step of creating a database, wherein said database comprises said (N) indicators.

7. The method of claim 6, wherein said creating a database step further includes creating a database which includes, for each value of (j), $RT_{(j)SLA}$, $x_{(j)OPT}$, $X_{(j)MAX}$, and optionally $X_{(j)MIN}$.

8. The method of claim 6, further comprising the steps of:
providing a Quality of Service server capable of communicating with each of said (N) applications and said information storage and retrieval system;
disposing said database in said Quality of Service server.

9. The method of claim 6, further comprising the steps of:
providing a gateway device capable of communicating with each of said (N) applications and said information storage and retrieval system;
disposing said database in said gateway device.

10. The method of claim 1, further comprising the steps of:
providing a gateway device capable of communicating with each of said (N) applications and with said information storage and retrieval system, wherein said gateway device includes an I/O request queue;
wherein said delaying execution of I/O requests step further comprises enqueuing said I/O requests in said I/O request queue.

11. The method of claim 1, wherein said information storage and retrieval system comprises two or more data caches, two or more non-volatile storage devices, and three or more hard disk data storage devices using a RAID protocol.

12. The method of claim 1, wherein said providing an information storage and retrieval system step further comprises providing an information storage and retrieval system comprising a plurality of portable cartridges, wherein each portable cartridge comprises a magnetic tape.

13. The method of claim 12, wherein said providing an information storage and retrieval system step further comprises providing an information storage and retrieval system comprising a virtual tape server.

14. A method to optimize the total value of a set of applications being run for one or more customers, comprising the steps of:
providing an information storage and retrieval system, comprising one or more data storage devices;
entering into (N) service level agreements with one or more customers by a storage services provider to provide data storage services for (N) applications using said information storage and retrieval system, wherein each of said (N) service level agreements specifies a maximum response time $RT_{SLA}$ comprising an elapsed time from receipt by the storage services provider from a storage services customer of a request to write data to a data storage device or read data from a data storage device and completion of that request, and wherein the (j) th SLA recites $RT_{(j)SLA}$, wherein (j) is greater than or equal to 1 and less than or equal to (N), and wherein (N) is greater than 1;
calculating for each value of (j), a monetary value per unit throughput $v_j$ for the (j) th application;
calculating (N) optimum data flow rates to maximize the revenues to the storage services provider;
determining for each value of (j) an optimum data flow rate $x_{(j)OPT}$;
initializing, for each value of (j), a maximum data flow rate $X_{(j)MAX}$ that the (j) th application can utilize;
determining, for each value of (j), if $x_{(j)OPT}$ equals $X_{(j)MAX}$;
for each value of (j) wherein $x_{(j)OPT}$ does not equal $X_{(j)MAX}$, delaying execution of I/O requests from the (j) th application, such that the average response time for the (j) th application equals $RT_{(j)SLA}$.

15. An article of manufacture comprising a non-transitory computer readable medium having computer readable program code disposed therein to optimize revenue realized under (N) service level agreements entered into by a storage services provider with one storage services customer to provide data storage services for (N) applications using an interconnected information storage and retrieval system comprising one or more data storage devices, wherein each of said (N) service level agreements specifies an average maximum response time $RT_{SLA}$ comprising an elapsed time from receipt by the storage services provider from a storage services customer of a request to write data to a data storage device or read data from a data storage device and completion of that request, and wherein the (j) th SLA recites $RT_{(j)SLA}$, wherein (j) is greater than or equal to 1 and less than or equal to (N), and wherein (N) is greater than 1, the computer readable program code comprising a series of computer readable program steps to effect:
obtaining for each value of (j), a monetary value per unit throughput $v_j$ for the (j) th application;
calculating (N) optimum data flow rates to maximize the revenues to the storage services provider;
determining for each value of (j) an optimum data flow rate $x_{(j)OPT}$;
estimating, for each value of (j), a maximum data flow rate $X_{(j)MAX}$ that the (j) th application can utilize;
determining, for each value of (j), if $x_{(j)OPT}$ equals $X_{(j)MAX}$;
for each value of (j) wherein $x_{(j)OPT}$ does not equal $X_{(j)MAX}$, delaying execution of I/O requests from the (j) th application, such that the average response time for the (j) th application equals $RT_{(j)SLA}$.

16. The article of manufacture of claim 15, further comprising (N) indicators, wherein each of said (N) indicators can comprise a first value or a second value, said computer readable program code further comprising a series of computer readable program steps to effect:
for each value of (j) wherein $x_{(j)OPT}$ equals $X_{(j)MAX}$, setting the (j) th indicator to said first value;
for each value of (j) wherein $x_{(j)OPT}$ does not equal $X_{(j)MAX}$, setting the (j) th indicator said second value;
servicing I/O requests from said (N) applications;
operative if the (j) th indicator is set to said first value, measuring $X_{(j)MAX}$;
operative if the (j) th indicator is set to said second value, measuring $X_{(j)MIN}$, wherein $X_{(j)MIN}$ comprises the minimum data flow rate for the (j) th application to achieve $RT_{(j)SLA}$.

17. The article of manufacture of claim 16, said computer readable program code further comprising a series of computer readable program steps to effect forming a bitmap comprising (N) bits, wherein said bitmap comprises said (N) indicators.

18. The article of manufacture of claim 16, said computer readable program code further comprising a series of computer readable program steps to effect creating a database, wherein said database comprises said (N) indicators.

19. The article of manufacture of claim 18, wherein said computer readable program code to effect creating a database further comprises a series of computer readable program steps to effect creating a database which includes, for each value of (j), $RT_{(j)SLA}$, $x_{(j)OPT}$, $X_{(j)MAX}$, and optionally $X_{(j)MIN}$.

20. The article of manufacture of claim 15, further comprising an I/O request queue, wherein said computer readable program code to delay execution of I/O requests further comprising a series of computer readable program steps to effect enqueuing said I/O requests in said I/O request queue.

21. The article of manufacture of claim 15, wherein said article of manufacture comprises a gateway device interconnected with said (N) applications and with said information storage and retrieval system.

22. An article of manufacture comprising a non-transitory computer readable medium having computer readable program code disposed therein to optimize the total value of a set of applications being run for one or more storage services customers using an interconnected information storage and retrieval system comprising one or more data storage devices, wherein said information storage and retrieval system is operated by a storage services provider, and wherein each of said (N) service level agreements specifies a maximum response time $RT_{SLA}$ comprising an elapsed time from receipt by the storage services provider from a storage services customer of a request to write data to a data storage device or read data from a data storage device and completion of that request, and wherein the (j) th SLA recites $RT_{(j)SLA}$, wherein (j) is greater than or equal to 1 and less than or equal to (N), and wherein (N) is greater than 1, the computer readable program code comprising a series of computer readable program steps to effect:

obtaining for each value of (j), a monetary value per unit throughput $v_j$ for the (j) th application;

determining for each value of (j) an optimum data flow rate $x_{(j)OPT}$;

estimating, for each value of (j), a maximum data flow rate $X_{(j)MAX}$ that the (j) th application can utilize;

determining, for each value of (j), if $x_{(j)OPT}$ equals $X_{(j)MAX}$;

for each value of (j) wherein $x_{(j)OPT}$ does not equal $X_{(j)MAX}$, delaying execution of I/O requests from the (j) th application, such that the average response time for the (j) th application equals $RT_{(j)SLA}$.

23. A computer program product encoded in a non-transitory information storage medium and usable with a programmable computer processor to optimize revenue realized under (N) service level agreements entered into by a storage services provider and one storage services customer to provide data storage services for (N) applications using an interconnected information storage and retrieval system comprising one or more data storage devices, wherein each of said (N) service level agreements specifies an average maximum response time $RT_{SLA}$ comprising an elapsed time from receipt by the storage services provider from a storage services customer of a request to write data to a data storage device or read data from a data storage device and completion of that request, and wherein the (j) th SLA recites $RT_{(j)SLA}$, wherein (j) is greater than or equal to 1 and less than or equal to (N), and wherein (N) is greater than 1, comprising:

computer readable program code which causes said programmable computer processor to obtain for each value of (j), a monetary value per unit throughput $v_j$ for the (j) th application;

computer readable program code which causes said programmable computer processor to calculate (N) optimum data flow rates to maximize the revenues to the storage services provider;

computer readable program code which causes said programmable computer processor to determine for each value of (j) the optimum data flow rate $x_{(j)OPT}$;

computer readable program code which causes said programmable computer processor to estimate, for each value of (j), a maximum data flow rate $X_{(j)MAX}$ that the (j) th application can utilize;

computer readable program code which causes said programmable computer processor to determine, for each value of (j), if $x_{(j)OPT}$ equals $X_{(j)MAX}$;

computer readable program code which, for each value of (j) wherein $x_{(j)OPT}$ does not equal $X_{(j)MAX}$, causes said programmable computer processor to delay execution of I/O requests from the (j) th application, such that the average response time for the (j) th application equals $RT_{(j)SLA}$.

24. The computer program product of claim 23, wherein said (N) applications are interconnected to said information storage and retrieval system via a gateway device comprising (N) indicators, wherein each of said (N) indicators can comprise a first value or a second value, said computer readable program code further comprising a series of computer readable program steps to effect:

computer readable program code which, for each value of (j) wherein $x_{(j)OPT}$ equals $X_{(j)MAX}$, causes said programmable computer processor to set the (j) th indicator to said first value;

computer readable program code which, for each value of (j) wherein $x_{(j)OPT}$ does not equal $X_{(j)MAX}$, causes said programmable computer processor to set the (j) th indicator said second value;

computer readable program code which causes said programmable computer processor to service I/O requests from said (N) applications;

computer readable program code which, if the (j) th indicator is set to said first value, causes said programmable computer processor to measure $X_{(j)MAX}$;

computer readable program code which, if the (j) th indicator is set to said second value, causes said programmable computer processor to measure $X_{(j)MIN}$, wherein $X_{(j)MIN}$ comprises the minimum data flow rate for the (j) th application to achieve $RT_{(j)SLA}$.

25. The computer program product of claim 24, further comprising computer readable program code which causes said programmable computer processor to form a bitmap comprising (N) bits, wherein said bitmap comprises said (N) indicators.

26. The computer program product of claim 24, further comprising computer readable program code which causes said programmable computer processor to create a database, wherein said database comprises said (N) indicators.

27. The computer program product of claim 26, wherein said computer readable code which causes said programmable computer processor to create a database further comprises computer readable program code which causes said programmable computer processor to creating a database which includes, for each value of (j), $RT_{(j)SLA}$, $x_{(j)OPT}$, $X_{(j)MAX}$, and optionally $X_{(j)MIN}$.

28. The computer program product of claim 24, wherein said gateway device further comprises an I/O request queue, wherein said computer readable code which causes said processor to delay execution of I/O requests further comprises computer readable program code which causes said programmable computer processor to enqueue said I/O requests in said I/O request queue.

29. A computer program product encoded in a non-transitory information storage medium and usable with a programmable computer processor to optimize the total value of a set of applications being run for one or more storage services customers using an interconnected information storage and retrieval system comprising one or more data storage devices, wherein said information storage and retrieval system is operated by a storage services provider, and wherein each of said (N) service level agreements specifies an average maximum response time $RT_{SLA}$, and wherein the (j) th SLA recites $RT_{(j)SLA}$ comprising an elapsed time from receipt by the storage services provider from a storage services customer of a request to write data to a data storage device or read data from a data storage device and completion of that request, wherein (j) is greater than or equal to 1 and less than or equal to (N), and wherein (N) is greater than 1, comprising:

computer readable program code which causes said programmable computer processor to obtaining for each value of (j), a monetary value per unit throughput $v_j$ for the (j) th application;

computer readable program code which causes said programmable computer processor to calculate (N) optimum data flow rates to maximize the revenues to the storage services provider;

computer readable program code which causes said programmable computer processor to determining for each value of (j) the optimum data flow rate $x_{(j)OPT}$;

computer readable program code which causes said programmable computer processor to estimating, for each value of (j), a maximum data flow rate $X_{(j)MAX}$ that the (j) th application can utilize;

computer readable program code which causes said programmable computer processor to determining, for each value of (j), if $x_{(j)OPT}$ equals $X_{(j)MAX}$;

computer readable program code which, for each value of (j) wherein $x_{(j)OPT}$ does not equal $X_{(j)MAX}$, causes said programmable computer processor to delaying execution of I/O requests from the (j) th application, such that the average response time for the (j) th application equals $RT_{(j)SLA}$.

* * * * *